Nov. 16, 1965  R. L. SMIRL  3,217,846
SEMI-AUTOMATIC TRANSMISSION
Filed Dec. 6, 1962  5 Sheets-Sheet 1
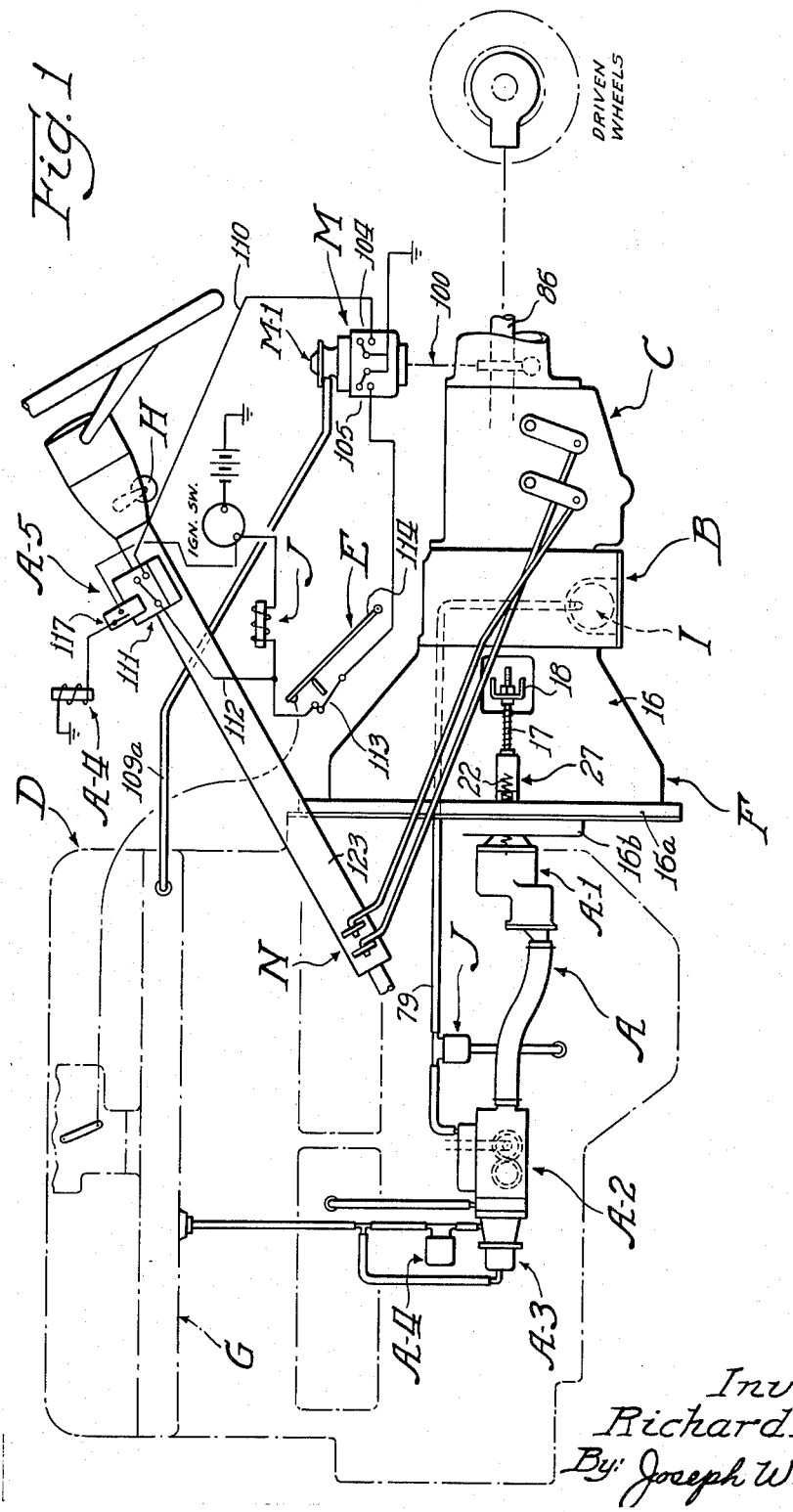
Inventor:
Richard L. Smirl
By: Joseph W. Malleck Atty

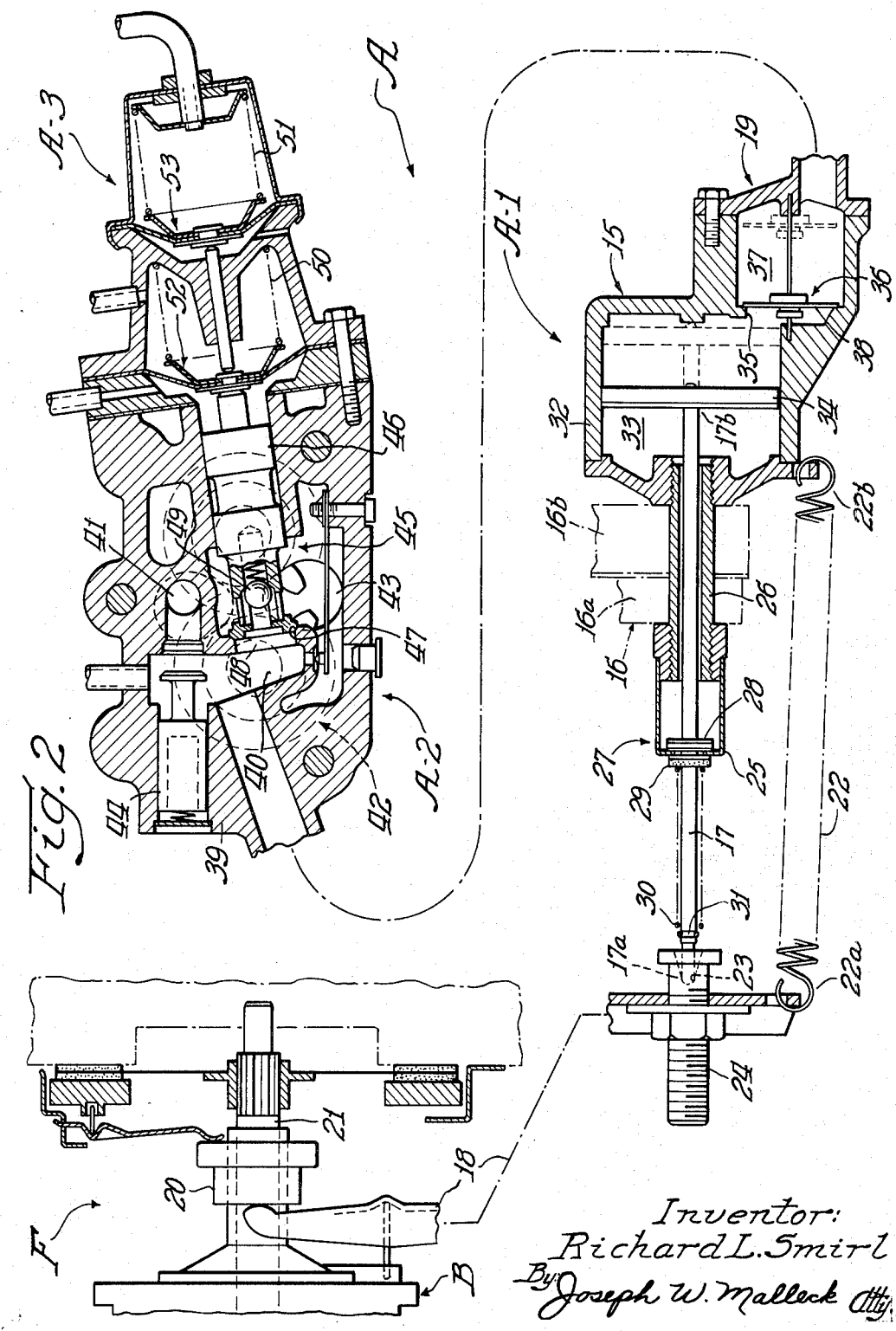

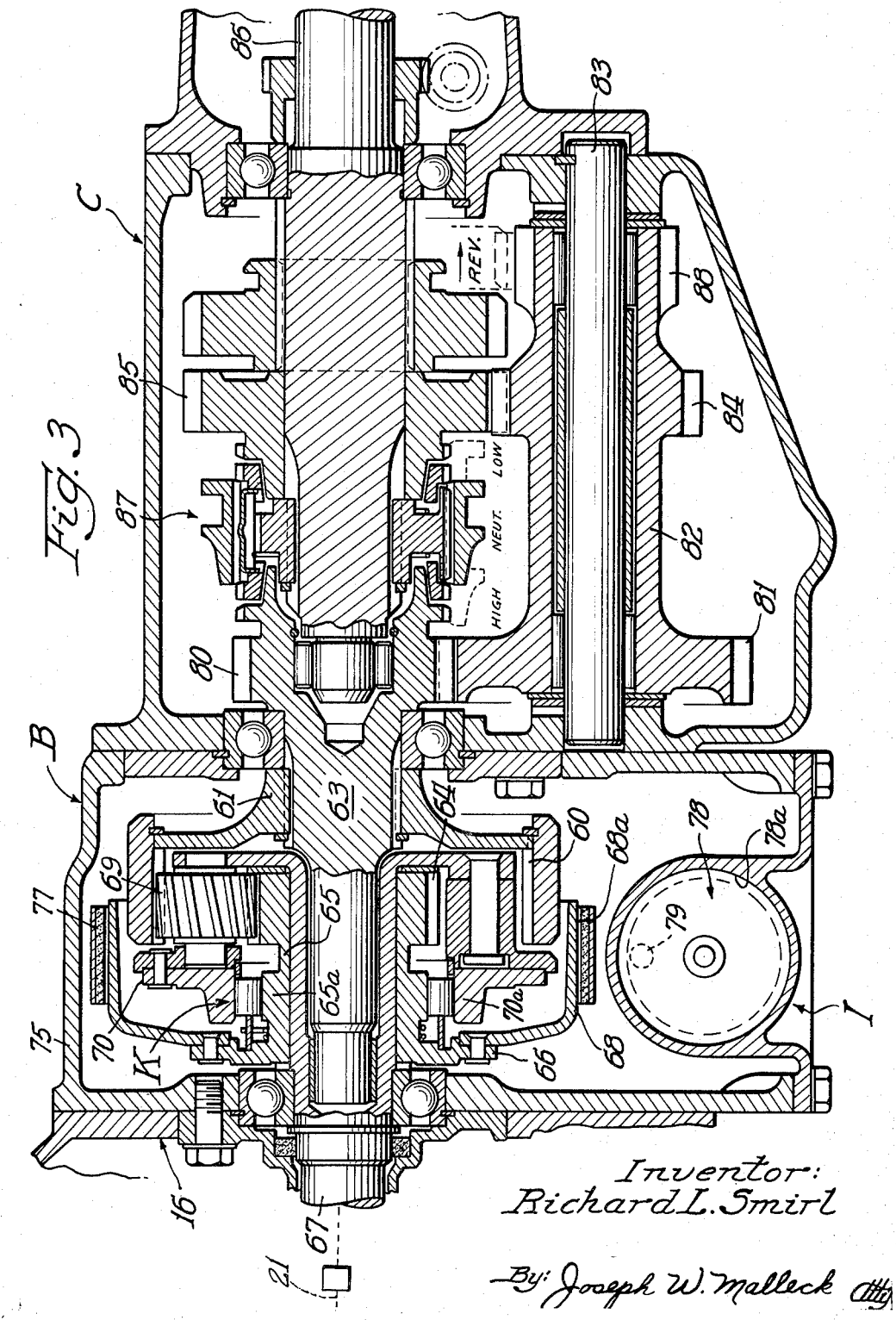

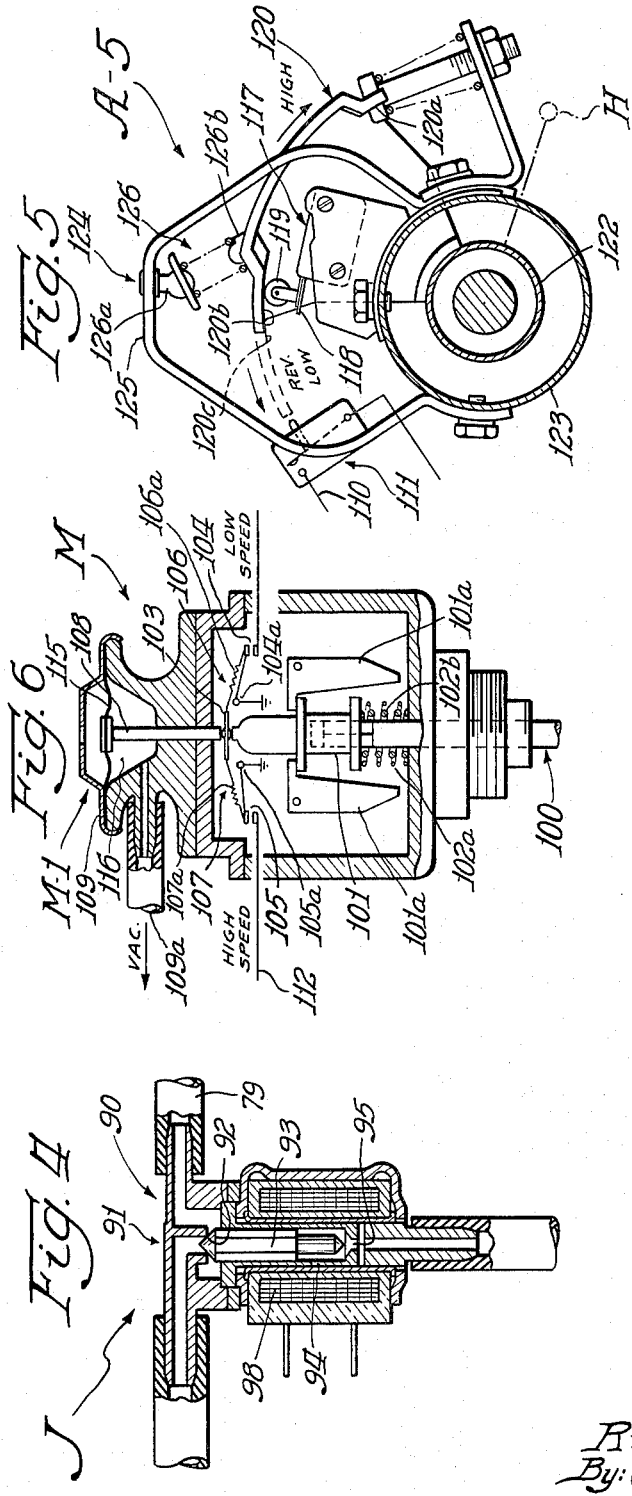

Nov. 16, 1965     R. L. SMIRL     3,217,846
SEMI-AUTOMATIC TRANSMISSION
Filed Dec. 6, 1962     5 Sheets-Sheet 5
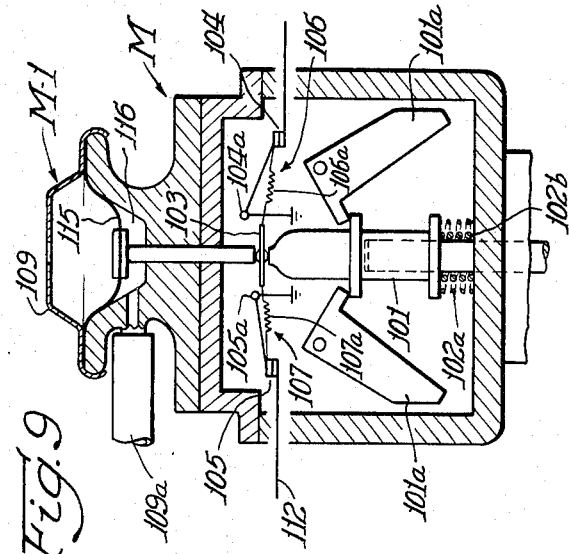
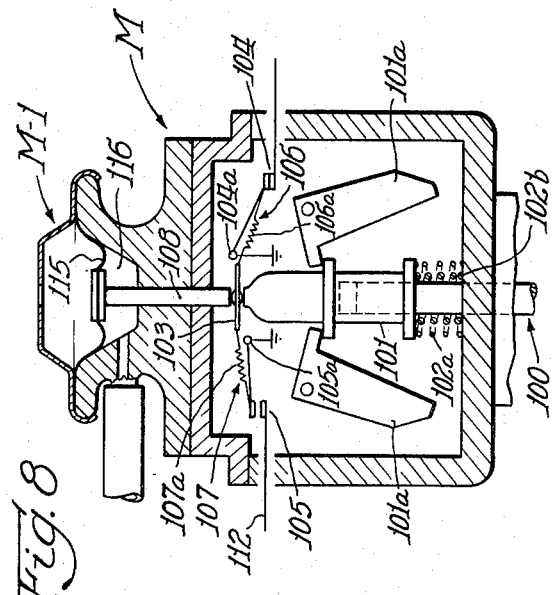
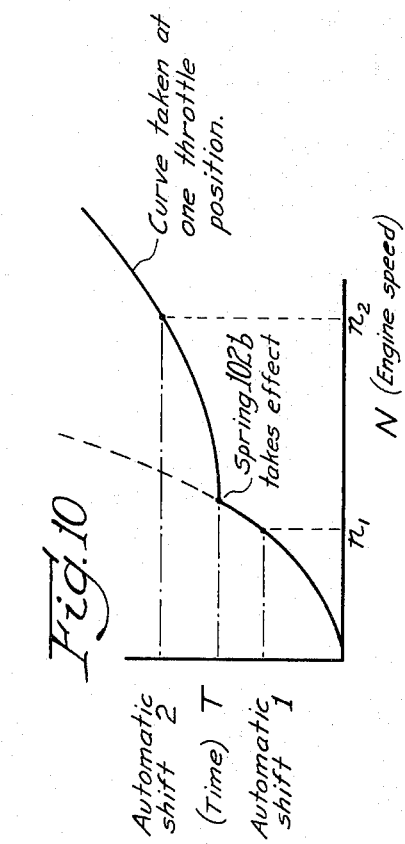
Inventor:
Richard L. Smirl
By: Joseph W. Malleck Atty United States Patent Office 3,217,846
Patented Nov. 16, 1965

3,217,846
SEMI-AUTOMATIC TRANSMISSION
Richard L. Smirl, La Grange Park, Ill., assignor to Borg-Warner Corporation, Chicago, Ill., a corporation of Illinois
Filed Dec. 6, 1962, Ser. No. 242,818
14 Claims. (Cl. 192—.092)

This invention relates to transmissions and more particularly to transmissions employing planetary gear units in series with a countershaft gearing unit and being particularly adapted for use on motor vehicles.

As a result of recent interest shown in automatic clutches for passenger motor vehicle use and particularly the recent popularization of the automatic clutch disclosed and claimed in copending U.S. application Serial No. 128,196, assigned to the assignee of this invention, there has arisen a refined need for a transmission which possesses characteristics lying between a fully-automatic transmission and a type of semi-automatic transmission employing a conventional countershaft gearing unit with an automatic clutch. Such a transmission would have certain shifts between speed ratios completely automatic while other shifts would be manually initiated but accompanied by automatic operation of the clutch.

Pursuant to the above needs, the present invention contemplates employing a planetary gear unit incorporating one-way braking means which permit a change of gear ratios within the planetary gear unit by "picking off" of the one-way brake means; the countershaft gear unit in series with the planetary gear unit is of a two-speed type and utilizes a synchronizer means for shifting between two forward speed ratios. The input power to the gearing unit is controlled by an automatic clutch device of the positive hydraulic actuated type; the automatic controls for the clutch and friction devices of the planetary gear unit may have common elements. This transmission further comprises unique governor control means which cooperate with a manual electrical switch and quadrant normally placed on the steering column of the automobile.

Therefore, it is a primary object of this invention to provide a new and improved transmission of the type utilizing a planetary gear unit and a countershaft gear unit in series.

Still another object of this invention is to provide a transmission which uniquely weds the characteristics of certain fully automatic shifts and other shifts which are manually initiated but accompanied by the fully automatic operation of a clutch. A specific feature of this object is the provision of a solenoid-actuated hydraulic valve controlling the operation of a braking element of the planetary gear unit.

Another object of this invention is to provide a semi-automatic transmission which has four forward speed ratios and two reverse speed ratios.

Another object of this invention is to provide a transmission utilizing a planetary gear unit and a countershaft gear unit in driving series and employing a positive-acting hydraulic actuated clutch for selective control of power transmission therethrough, the transmission being particularly characterized by controls therefor including a hydraulic actuator for the clutch having means regulating the pressure supplied thereto in accordance with the depression of an accelerator pedal of the engine and in accordance with the rate of discharge of a thin plate orifice, said controls further comprising a hydraulically actuated friction device for establishing a certain reaction within the planetary gear unit and which friction device is supplied with pressure from said actuator of the clutch in accordance with movement of the gear shift lever and as further modulated by the attainment of a predetermined speed of the transmission output shaft.

Another object of this invention, in accordance with the preceding object is the provision of the above controls wherein the modulation by attainment of a predetermined speed is sensed by a two-stage governor which is further modulated in accordance with the depression of the accelerator pedal of the engine so as to affect the timing or regulation of fluid supply to the friction device. Thus, not only the timing but also the force with which the hydraulic friction device is applied is regulated in accordance with the accelerator pedal depression.

Another object of this invention is to provide a transmission in accordance with the two preceding objects in which fluid supply regulator comprises an electrical solenoid valve associated in series with the governor means having electrical contacts, the electrical circuit associating said means being opened and broken in accordance with a kick down position of the accelerator pedal of the engine or in accordance with the selection of at least one gearing ratio of the transmission for selecting the stage of the governor required.

Other objects and features of the invention will be readily apparent to those skilled in the art from the specification and appended drawings illustrating a certain preferred embodiment in which:

FIGURE 1 is a schematic illustration of an internal combustion engine and a transmission system drivingly connected to driven wheels and embodying the principles of this invention;

FIGURE 2 is an enlarged sectional view illustrating the automatic clutch and clutch controls for the transmission of FIGURE 1;

FIGURE 3 is an enlarged central sectional view of the transmission unit incorporating both the planetary gear unit and countershaft unit;

FIGURE 4 is an enlarged, partly sectional view of the brake solenoid valve constituting part of the electrically operated controls for the transmission;

FIGURE 5 is an enlarged sectional view of the shift quadrant of said controls;

FIGURE 6 is an enlarged, partly sectional view of the governor forming part of the controls;

FIGURE 7 is a chart illustrating the various drive ratios and conditions of the transmission;

FIGURE 8 is an enlarged view of the governor as in FIG. 6 and illustrating another operative position thereof;

FIGURE 9 is still another enlarged view of the governor as in FIG. 6 and illustrating still another operating position and FIGURE 10 is a graphical illustration of engine speed platted against time showing the automatic shift points.

Turning now more specifically to the drawings and particularly to FIGURE 1, there is schematically illustrated preferred embodiment of a transmission providing for four forward speed ratios and two reverse speed ratios.

*General arrangement and working principle*

Schematically illustrated in FIGURE 1 is a preferred embodiment of the present invention having an automatic clutch control mechanism A associated with a four-forward speed transmission employing a planetary gear unit B and a countershaft gear unit C in series therewith. The transmission and automatic control mechanism have in certain instances common control elements which provide the basis for certain novel combination features of this invention. The clutch control mechanism or system A is shown as connected to a power unit of a typical automobile with which the mechanism cooperates. The power unit comprises an internal combustion engine D controlled by throttle means E and is adapted to transmit torque to the transmission B-C through a friction engaging device or disc-type clutch F (the clutch device is more particularly disclosed in copending U.S. application Serial No. 128,916 assigned to the assignee of this invention). The components, F, B, and C occupy a fraction of the space normally occupied by a fully automatic hydraulic transmission and are subject to much less maintenance problems. The transmission components B and C together have a semi-automaic operation; the provision of the automatic clutch mechanism A adapts the entire transmission assembly so that it may transmit torque in a seemingly automatic fashion similar to a fully-automatic transmission for certain shifts which require manual actuation.

The mechanism A generally comprises the following principal elements: a clutch actuating means A-1 for operating the clutch F and actuated by engine lubrication oil pumped thereto, a primary control valve A-2 for regulating the oil pressure administered to the servomotor or actuating means A-1 and having a vacuum-operated modulating means A-3 connected to the engine manifold G, an electrically operated dump valve means A-4, and a switch means A-5 actuated by a gear shift lever means H. The control valve and dump valve may each be conveniently mounted on the engine block or clutch housing and the control valve may be mounted on the engine lubrication pump in place of pump cover plate; these mountings promote the adaptability of the clutch control mechanism to most any automobile construction.

To maintain the clutch F in the engaged condition for normal drive purposes, lubrication oil is pumped by the engine to the servomotor or actuating means A-1 and is maintained at an operative pressure level by control valve A-2 so as to apply sufficient clutch engaging force to meet varying driving needs. Upon a manual change in gear ratios of the transmission component C, the switch means A-5 automatically actuate the electrical dump valve A-4 to fully communicate the engine manifold G with the vacuum-operated modulating means A-3 for affecting valve A-2 in a manner to dump servo oil pressure to an engine sump (not shown) and thereby disengages the clutch F with relief of pressure in the servomotor or actuating means A-1. De-clutching takes place so rapidly that no difficulty is experienced even during the fastest gear changes. Re-engagement of the clutch takes place as the shift lever completes its gear change stroke, whereupon the dump valve is de-energized.

Turning to the countershaft gear unit C, it is of a construction adapted to have two forward speeds which are selected manually and engaged through a synchronizer L.

For predetermined automatic shifts, the planetary gear unit B employs a hydraulic brake means I to establish certain gear ratios when engaged. The oil pressure to the hydraulic brake means I is controlled by an electrical solenoid valve means J which in turn has torque modulation by drawing fluid from valve A-2 which is torque modulated. The operation of the solenoid valve J is in turn controlled by a two-speed electric governor M which has torque modulating means M-1. A one-way friction or clutch means K is provided between certain elements of the planetary gear unit so that when the fluid pressure within the hydraulic brake I is dumped, the planetary gear unit will operate as a single unit. This provides an extremely effective and smooth transition between the two gear ratios of the planetary gear unit which may be more commonly referred to as "picking off" of the one-way brake.

The components B and C together comprise a transmission which provides for four forward speeds and two speeds in reverse. The shift between first and second is adapted to take place automatically by virtue of the planetary gear unit which is governor controlled. The shift between second and third is accomplished manually by a gear shift means and which simultaneously and automatically operates the clutch mechanism A. The shift between third and fourth is again accomplished automatically between the planetary gear units and results in an overdrive gear ratio in fourth gear. Due to the automatic operation of the planetary gear unit, there are two reverse speeds for the reverse condition of the countershaft gear unit.

*Automatic clutch control mechanism*

Turning now in more particularity to FIGURES 1 and 2, the automatic clutch actuating mechanism A specifically comprises a servomotor 15 mounted on the housing 16 of the clutch device F and has a thrust rod 17 operatively connected to a clutch actuating lever 18; the fluid intake of the servomotor is regulated by a fluid accumulator valve assembly 19 integrally fixed to the servomotor. The clutch actuating lever 18 extends through an opening in the clutch housing 16 and is adapted to operatively and axially slide a bearing collar 20 journalled to the clutch output shaft 21 which in turn engages a plurality of operating levers which function to bring the friction members of the clutch device together for conjoint rotation. Upon de-activation of the servomotor, a large tension coil spring 22 returns the lever 18 to a position in which the clutch device is disengaged; the spring 22 is mounted with one end 22a engaging the outer extremity of the lever 18 and the other end 22b engaging a portion of the servomotor structure.

As shown in FIGURE 1, the thrust rod 17 is arranged with one end 17a engaging a concave seat 23 of a thrust plug 24, the thrust plug being threadably and adjustably carried in the lever 18. The thrust rod 17 is slidably disposed in a sleeve member 26 which in turn is mounted in outer peripheral flanges 16a of the clutch housing 16 and flange 16b of the engine block. The sleeve member 26 acts as a dowel in aligning the clutch housing on tht engine block during assemblage. The rod is adapted to articulate therein. A wear compensating means 27 is mounted about the thrust rod 17 and is more fully detailed in copending application Serial No. 163,659. Generally speaking, the wear compensating means comprises a plurality of Belleville-type washers 28 which have their inner periphery frictionally engaged with the thrust rod and are adapted to be moved axially thereon when brought into contact with the outer stop sleeve 25.

An annular seal 29 is carried on the thrust rod and is in engagement with the outer end of the wear compensating means for providing an air seal between the sleeve member and the rod; a coil compression spring 30 is also carried on the thrust rod and has one end received by an annular groove 31 adjacent the end 17a of the rod and has an opposite end engaging the seal 29, the spring functioning to maintain the seal in proper sealing relationship with the end of the wear compensating means.

The construction of the servomotor A-1 comprises a casing 32 having an internal cylindrical cavity 33 adapted to receive a cylindrical piston 34 slidably disposed therein and which is attached to the end 17b of the thrust rod 17 extending thereinto. A fluid supply opening 35 is formed in the casing at one end of the major cavity 33 and communicates with an accumulator valve assembly 36 having a cylindrical cavity 37 therein. A floating disc valve 38 is adapted to reciprocate therein and has its outer periphery spaced from the walls of the internal cavity 37 of the accumulator valve assembly. The floating valve is adapted to permit an initial volume of fluid to be quickly admitted to the servomotor chamber; and when forced against an opposite end of the accumulator valve assembly, it thereafter permits a gradual build-up of pressure in the servomotor by virtue of a small opening provided in the disc valve.

Communicating with the actuating mechanism A is primary control valve A-2 comprising casing 39 having a control chamber 40, fluid inlet means 41 in communication with a suitable fluid source as provided by pump 42 (the gearing of the pump is shown in dotted outline in FIGURE 2), and a fluid outlet 43 in communication with a fluid sump (not shown). A lubrication valve means 44 is provided to prevent fluid from entering chamber 40 until a predetermined pressure value has been attained thereby diverting sufficient oil to the engine of the automobile in the initial stages of pump operation.

The control valve A-2 further comprises a pressure actuated control device 45 consisting of a valve member 46 normally spring urged against shoulders defining a pressure regulating port and valve member seat 47. The valve member 46 contains therein a bypass orifice means or seat 48 controlled by check valve 49 thereby permitting pressure in the control chamber to build parabolically when open.

Springs 50 and 51 normally urge the valve member 46 to a closed or blocked port position and are respectively controlled by vacuum chambers and diaphragm assemblies 52 and 53. Vacuum chamber and diaphragm assembly 53 is placed continuously in communication with the vacuum manifold of the engine D to impart a control effect to the pressure in chamber 40 to vary in accordance with the depression of the gas pedal for the engine. The vacuum chamber and diaphragm assembly 52 is selectively placed in full communication with the manifold of the engine for dumping pressure in chamber 40 to release the clutch by operation of solenoid valve A-4 which is in turn controlled by manual operated means A-5. The switch means A-5 is adapted so that during the shifting movement of the manual lever H, a camming means initially closes the switch before a gear change is initiated and opens the switch after the gear change is made, all during the arcuate movement of lever H; this is brought about by lost motion means (not shown) disposed on the shift tube to regulate the timing.

Switch means A-5 is electrically associated in series with solenoid valve A-4 as more fully disclosed in U.S. patent application Serial No. 128,916. The switch means A-5 comprises a microswitch 117 having a switch member 118 which is normally biased to the broken-line position as shown in FIGURE 5 thereby closing the switch; when the switch member 118 is cammed or forced to the position as shown in FIGURE 5, the switch 117 is then broken to interrupt electrical circuit therethrough. The switch member 118 carries a cam follower 119 on one end thereof adapted to be brought into engagement with surfaces 120a, 120b, and 120c respectively (corresponding to low, reverse, and high manual gear positions of lever H). The cam surfaces are carried on bracket 120 which is mounted upon a shift tube 122 forming part of the shift means N and concentrically disposed in stationary jacket tube 123. Thus upon movement of the shift tube 122 by manual actuation of shift lever H, the camming surfaces and bracket will thereby accordingly be rotated or moved axially relative to the jacket tube 123 as desired.

A spring-urged, off-center mechanism 124 is employed to retain the camming surfaces and bracket 120 in the extreme positions corresponding to gear positions during driving conditions. A bracket housing 125 is fixedly secured to jacket tube 123 having one end 126a of a spring-urged swivel 126 secured thereto with an opposite end 126b secured to the camming bracket 120. When the bracket 120 is in a position whereby the switch member 118 is spaced intermediate the camming surfaces and off thereof, the spring of the swivel 126 will be fully compressed and in a centered position. The spring will tend to move the swivel to an off-center position and thereby prevents the camming surfaces from jumping out of the intended gear positions during rough driving conditions.

The planetary gear unit B is of the overdrive type comprising a housing 75 secured to the housing 16 of the clutch and having a ring gear 60 splined to the outer periphery of hub 61 connecting with second intermediate shaft 63 journalled by suitable bearings on the housing 75 and constituting the input shaft to the countershaft gear unit C. A sun gear 64 is rotatably disposed about the first intermediate shaft 67 journalled by suitable bearings on the housing 75 and has integrally formed thereto a sleeve 65; sleeve 65 carries a radial extension 66 to which is secured an annular brake drum 68 having a cylindrical surface 68a. A plurality of planet gears 69 (one being shown in the drawing) are in mesh with the sun and ring gears, each being carried by a carrier 70. A one-way friction device K is employed to act between the planet gear carrier 70 and the sun gear; sleeve 65 has a portion 65a constituting an inner race for the one-way friction device, and carrier 70 has an axial extension 70a constituting an outer race for the one-way friction device.

A brake band 77, carrying friction material is adapted to be selectively engaged with the brake drum 68; the brake band 77 may be actuated by a suitable servo-mechanism 78 such as of type described as A-1 for the clutch; the servomechanism is disposed within chamber 78a defined in the lower portion of the planetary gear unit housing 75. The servomechanism is supplied with fluid through conduit 79 leading thereto.

The countershaft gear unit C comprises a gear 80 formed on one end of second intermediate shaft 63 which is in mesh with a gear 81 formed on one end of a sleeve shaft 82 and which is rotatably mounted about a countershaft 83. The sleeve shaft 82 also carries gear 84 at an intermediate portion thereof in mesh with gear 85 rotatably disposed about output shaft 86 of the transmission. A synchronizer means 87 is provided to selectively lock up the output shaft 86 directly with shaft 63 (providing a direct drive through unit C) or drivingly connect output shaft 86 with gear 85 (providing a low speed drive through unit C). A reverse drive ratio is provided through unit C by gear 88 formed on the other end of sleeve shaft 82 selectively enmeshed with gear 89 rotatably and axially slidable on output shaft 86.

Turning now more particularly to the automatic controls for the transmission unit B and C, the servomechanism 78 for the hydraulic brake band 77 of the planetary gear unit B is actuated by a fluid pressure force taken from control chamber 40 of the primary valve A-2. The admission or blocking of fluid pressure to servomechanism 78 is regulated by a solenoid valve 90 which is of a construction similar to solenoid valve A-4 (see U.S. application Serial No. 128,916 for further disclosure). Briefly, the valve comprises means defining a valve portion 91 carrying a valve seat 92 to interrupt fluid flow between an inlet and outlet, a valve member 93 of hexagonal cross-sectional shape adapted to move axially within a casing 94, the casing being of a circular, cylindrical cross section thereby defining passageways between the sides of the valve member 93 and the housing through which fluid may be drained through port 95 back to sump or to admit air to the inlet line 96 when the valve is in the closed condition. A solenoid winding 98 is employed to move the member 93 away from closed position and blocking port 95 as selected.

The energization of solenoid valve 90 is controlled by a two-stage governor M comprising a speed responsive element 100 drivingly connected to the output shaft of the transmission and adapted to carry about one end thereof a slidable element 101; the element 100 also carries centrifugal weights 101a adapted to urge the slidable element an incremental distance proportional to the speed of element 100. Element 101 is normally urged in stages by two differential springs 102a and 102b to an ertreme upward position for biasing upwardly a disc 103 the axial position of which controls two sets of electrical contacts 104 and 105. Overcenter resilient means 106 and 107 respectively are adapted to initially urge the contacts 104 and 105 apart or in a broken contact condition; means 107 and 106 are differently calibrated or arranged so that a different axial position of element 101 is required to overcome their respective resilient opening force and close the associated contacts. Referring to the FIGURES 6, 8 and 9, the resilient means 106 and 107 of the preferred embodiment, each more particularly comprises an overcenter spring 106a and 107a respectively, the overcentering spring having one end connected to the disc 103 and an opposite end connected to one of the respective contacts 104 or 105. As shown in FIGURE 6 the contacts 105 are spaced in an axial direction (referring to the axis of sliding of the disc 103) from the contacts 104. This enables the contacts 104 to be closed in accordance with a predetermined low speed ratio, since the centrifugal weights would only urge the disc 103 a distance downward sufficient to overcenter the spring 106a with the pivot point 104a of the contacts. Further downward movement of the disc 103 will eventually overcenter spring 107a with contact pivot 105a. This sequence of movements is clearly shown in FIGURES 8 and 9.

The contacts are electrically associated in parallel to each other but in series with the solenoid valve 90 so as to control the actuation thereof in accordance with two stages or the attainment of two different predetermined speed ranges by the transmission output shaft. The electrical leads 110 for the contacts 104 are placed in electrical series relationship with solenoid valve 90 only when the shift lever H is moved to the reverse or low manual gear position thereby enabling portions of the switch means A-5 to close a rocker switch 111 interposed in leads 110. Electrical leads 112 to contacts 105 are placed in electrical series relationship with solenoid valve 90 only when rocker switch 113 is maintained in its normally closed position; the switch 113 is adapted to be broken by a deep position of the accelerator pedal 114 (or kickdown position). When switch 111 is closed, the later closing of contacts 105 after 104 becomes superfluous, so that the second stage of the governor M becomes necessary when the switch means and shift lever H is moved out of low or reverse gear position thereby providing for actuation of the solenoid valve only through closing of contacts 105 at a higher calibrated speed of the transmission.

It is important to point out that the primary forces determining the axial position of the element 101 and determining the sequence of automatic closing of the contacts 104 and 105 is the balance between the spring means 102a and 102b against the forces of the centrifugal weight 101a. In order to provide automatic shift points at speeds which are quite widely spaced, (as shown in FIGURE 10), the use of differential springs 102a and 102b were employed. Spring 102a is of the compression type and is calibrated for a relatively low spring force. Spring 102a is disposed concentrically about the inner spring 102b which is also of the compression type but of a shorter length and calibrated for a greater spring force. Thus, during the low speed ranges of the engine and during which the first automatic shift will take place, the centrifugal weight 101a will be working only against spring 102a. During the higher speed range of the engine in which the second automatic shift will take place, the element 101 will pick up the heavier spring 102b to provide a combined heavier resisting force against the centrifugal weights and promote a change in the shape of the curve shown in FIGURE 8. This enables the second shift point to occur at a reasonable time lapse after the first shift point and at a much higher speed value.

The governor M is torque modulated by means M-1 comprising a pin 108 adapted to engage the disc 103; the pin 108 is in turn engaged by a flexible diaphragm 115 disposed within a chamber 116 defined by housing 109. One side of the diaphragm is acted upon by vacuum pressure supplied from the manifold through conduit 109a, and the other is acted upon by atmospheric pressure. The pin may thereby be moved by differential pressure on opposite sides of diaphragm 115 to assist the centrifugal weights and vary the predetermined speeds at which the governor contacts are closed in accordance with manifold vacuum.

The switch means A-5 cooperates with the two-speed governor in that rocker switch 111 is employed and closed when the camming bracket 120 is moved to the extreme low and reverse rotative positions, thus placing the low speed contacts 104 of the governor in electrical series with the solenoid valve 90.

*Operation*

Assuming the transmission is in the neutral condition, the clutch F is disengaged thereby leaving the planet carrier of the planetary gear unit B stationary with the hydraulic brake means I released; the synchronizer 87 is in a neutral condition whereby the countershaft gear unit is placed in a non-transmitting condition. The brake means I is maintained released as a result of the camming bracket 120 being positioned midway of its extreme rotative positions corresponding with "neutral" on the shift quadrant and accordingly stationing the shift tube so that the control arms leading to the countershaf gear unit neutralize the latter.

If it is desired to place the transmission in the first manual low gear position, the shift lever is moved to the correct quadrant position thereby rotating the shift tube and camming bracket 120 so that the switch element 118 is cammed downwardly, breaking the microswitch circuit, automatically deenergizing the solenoid valve A-4 controlling the vacuum line to the automatic clutch mechanism A resulting in clutch engagement and at the same time closing the rocker switch 111 by bringing the end of the camming bracket 120 thereagainst. With the closing of rocker switch 111, the governor is placed in effective electrical series relationship with the solenoid valve J for regulating the application of brake I. The low range governor contacts 104 are normally maintained opened thereby preventing the solenoid valve J from being energized to apply the brake I until such a time as a predetermined speed is reached. In the low manual gear range, power is transmitted through the clutch F to the carrier of the planetary gear unit B receiving reaction from the one-way friction device (torque modulated is used herein to mean imposing a signal proportional to manifold vacuum of an internal combustion engine which is considered in the art to be in correspondence to the torque demand of the engine) 71 acting between the carrier 70 and the sun gear 64 and transmitting its power to the ring gear 60 drivingly connected to the countershaft gear unit C. By movement of the shift lever H, the synchronizer L is moved to drivingly connect gear 84 with gear 85 on the output shaft.

When the predetermined shift speed (to second automatic) is reached, as determined by the action of the centrifugal weights 101a acting solely against the light spring 102a to adjust the axial position of disc 103 so as to overcenter the spring 106a with respect to the contact pivot 104a, the contacts 104 close and automatically permit hydraulic fluid to flow from the clutch control chamber 40 to the brake means I and thereby lock the sun gear 64. In making this automatic shift by control of governor M, the speed at which the shift takes place is modulated to correspond with the depression of the accelerator pedal since the vacuum in means M-1 corresponds to the depression of the pedal thereby varying the amount of spring force which must be overcome to close the contacts 104 and activate the solenoid valve.

The accelerator depression is also reflected in the fluid pressure applied to the brake means I; this follows from the fact that the control chamber 40 of the clutch mechanism A is continuously modulated by the second chamber thereof. The fluid source for the brake means I is taken from control chamber 40 and thereby reflects any control of the pressure therein. In summary, both the pressure with which the brake means I is applied as well as the timing of automatic shifts is regulated in accordance with the varying demands of the vehicle to provide for smooth engagement and improved wear characteristics.

In shifting from second to third forward gear ratios, the shift lever is manually moved to the opposite extreme arcuate position on the steering column so that the switch means A–5 is again decammed and broken for deactivating the solenoid valve A–4 and dumping the hydraulic fluid to disengage the clutch F. Simultaneously, the rocker switch 111 is broken since the camming bracket 104 is rotated away therefrom thus breaking the electrical connection to the low speed contact 104 of the governor and thereby conditioning the other electrical connection to the high speed set of contacts 105 for operation to automatically upshift to fourth gear. In normal ranges of accelerator pedal depression, the second rocker switch 113 is closed so that the solenoid valve 90 is conditioned for being actuated upon the governor reaching a high predetermined speed. The point at which the shift will occur now will be dependent upon the action of the centrifugal weights 101a, acting against both of the heavy and light springs 102a and 102b to position the disc 103 axially for overcentering the spring 107a relative to the contact pivot 105a. For third and fourth gear conditions of the transmission, the synchronizer 87 is engaged to directly lock up the input and output shafts of the conutershaft gear unit C.

While I have described my invention in connection with certain specific constructions and arrangements, it is to be understood that this is by way of illustration and not by way of limitation; and that the scope of my invention is defined solely by the appended claims which should be construed as broadly as the prior art will permit.

I claim:

1. In a transmission for an internal combustion engine having a manifold vacuum source and having driving and driven means and means for selectively providing a plurality of forward speed ratios, an overdrive planetary gear unit, comprising; sun and ring gears and a planetary gear in mesh with the sun and ring gears and having a planetary gear carrier, said carrier being drivingly connected with said driving shaft and said ring gear being connected with said driven means of said transmission, a one-way clutch means between said sun and planet carrier for providing a one-way direct forward drive through said planetary gear unit, a friction brake for said sun gear for completing an overdrive forward drive through the planetary gear unit, fluid pressure operated means effective to selectively engage said friction brake, means providing a source of fluid pressure for said brake varying with both the speed and manifold vacuum source of said engine, electrically operated solenoid valve means controlling the communication of the fluid source with said fluid pressure operated means, and electrical means responsive to the speed and to the manifold vacuum source of said engine of said driven means for energizing said solenoid valve means at variable predetermined speeds.

2. A transmission mechanism for an internal combustion engine having a manifold vacuum source and having driving and driven means for selectively providing at a plurality of forward speed ratios comprising: a friction engaging device arranged to provide for transmission of torque between said drive and driven members, a source of fluid pressure which varies is proportion to the speed and vacuum source of said engine, a casing having a control chamber for receiving said pressure fluid, a pressure actuated control device for regulating the fluid pressure in said chamber, means effective to apply an engaging force to the friction engaging device graduated in accordance with the fluid pressure in said chamber, manually controlled means for supplying an opening force on said control device to relieve the pressure in the chamber, an overdrive planetary gear unit including sun and ring gears and a planet gear in mesh with the sun and ring gears and having a planet gear carrier, said carrier being drivingly connected with said driving means and said ring gear being drivingly connected with said driven means, a one-way clutch between said sun and planet carrier for providing a one-way direct forward drive through said planetary gear unit, a friction brake band device for said sun gear for completing an overdrive forward drive through the planetary gear unit, fluid pressure operated means for selectively engaging said brake band device and being in communication with said control chamber, electrically operated solenoid valve means controlling the communication of said fluid pressure with said fluid pressure operated means, and electrical means responsive to the speed of said driven means for energizing said solenoid valve means at variable predetermined speeds.

3. The combination of claim 1, in which said transmission has low, second, third, high, and reverse speed ratios, and said speed responsive electrical means being comprised of an electrical governor having two sets of contact means, one set of contact means effective to close at a relatively low predetermined speed and the other of said contact means being adapted to close at a relatively high predetermined speed, and a selector means being adapted to place said solenoid valve means in electrical series connection with the electrical governor for energization thereof at a relatively low predetermined speed and effective to place said solenoid valve means in electrical series connection with the other of said contact means when moved to a high speed position.

4. A transmission as in claim 1, in which said engine has a throttle mechanism with a variable opening, and said electrical means responsive to the speed of said driven means having vacuum modulation means attached thereto adapted to delay the energization of said solenoid valve means with increasing throttle opening.

5. A transmission, comprising: an overdrive planetary gear unit having driving input means and a countershaft gear unit connected in series and adapted to provide a plurality of speed ratios therethrough, said transmission having only one friction band engaging device, the automatic application or non-application of which establishes different speed ratios; control means for said friction engaging device comprising hydraulic means adapted to apply an engaging force thereto varying in proportions to the speed and torque of said driving input means and electrically operated means for controlling the operation of said hydraulic means; and governor means adapted to selectively activate said electrical means in accordance with the output speed of said transmission.

6. A transmission for vehicles having an internal combustion engine and a throttle, comprising: driving and driven shafts; an overdrive planetary gear set drivingly connected to said driving shaft and having an output element; a countershaft gear set interconnecting the output element of said planetary gear set with said driven shaft, said planetary gear set having a oneway device for providing a direct forward drive therethrough and having a freewheeling element adapted to be braked for providing an overdrive forward drive power train therethrough, said countershaft gear set having manually operable means for selectively providing either a direct forward drive or a reduced forward drive power train therethrough; fluid operated brake means for braking said free-wheeling device of said planetary gear set with a force varying both with the speed of said engine and with the condition of said throttle; and electrically operated valve means for controlling fluid flow to said fluid operated brake means; governor means responsive to the speed of said driven shaft and adapted to sequentially control the energization of said electrically operated valve means according to at least two predetermined speeds.

7. A transmission as in claim 6, in which said transmission further comprises means substantially responsive to the torque of said vehicle engine for varying the predetermined speed at which said governor is adapted to control energization of said electrical valve means.

8. A transmission, comprising: an overdrive planetary gear unit and a countershaft gear unit having at least first and second gear ratios, each gear unit being connected in series and adapted to provide a plurality of speed ratios therethrough, said overdrive planetary gear unit having a friction engaging device, the application of which is adapted to change the transmission from certain of said speed ratios to another; operating means for operation of said friction engaging device including a solenoid; a source of electrical energy adapted to be placed in communication with said solenoid by one of two paths, one path connecting said source with said solenoid and having governor means placed therein adapted to close said path when the output speed of said transmission is at a relatively high speed, the other of said paths connecting said source with said solenoid having governor means therein adapted to close said path when the output speed of said transmission reaches a predetermined and relatively low speed, said operating means being effective to condition one of said paths for operation in response to the selection of one gear rotation by said manual means.

9. The transmission as in claim 8, in which said combination includes the transmission for an internal combustion engine having a throttle and said one path includes a switch adapted to brake said path when said throttle is moved into a substantially full throttle position.

10. The transmission as in claim 8, in which said transmission has a manually shifted means for changing between certain of speed ratios of said transmission, said shift means comprising a shift lever, a shift tube movable in response to said shift lever, a cylindrical jacket tube provided with an opening at an intermediate portion thereof and having the shift tube disposed concentrically therein adapted for rotative and axial movement in response to a change in position of said shift lever, said switch in said other path comprising a microswitch fixedly mounted on said jacket tube, an arcuate cam plate having a plurality of camming segments and being fixedly mounted on said shift tube and extending through said opening in the jacket tube and having a cam follower on said switch adapted to engage said cam plate for actuating the microswitch.

11. A transmission comprising: drive and driven shafts; a planetary gear unit drivingly connected to said driving shaft and including sun and ring gears and a planet gear in mesh with the sun and ring gears and having a planet gear carrier, said carrier being connected with said driving shaft and said ring gear being connected with said countershaft gear unit, a one-way clutch between said sun and planet carrier for providing a oneway direct forward drive through said planetary gear unit; a friction brake for said sun gear for completing an overdrive forward drive through the planetary gear unit, and fluid pressure operated means for selectively engaging said friction band brake; said countershaft gear unit having first and second input shafts, and a gear fixed to one of said input shafts, a gear cluster on said countershaft having one gear in mesh with said first named gear of said one input shaft, said countershaft unit having an output shaft with a gear in mesh with other gears of said countershaft gear cluster; manually operated synchronizer means adapted to complete a low forward speed drive and a high speed forward drive through said countershaft gear unit, said transmission having four forward speeds whereby the change in speed ratio between certain of said speed ratios may be accomplished automatically by operation of said friction brake.

12. A transmission for a vehicle having an internal combustion engine, comprising: an engine driven shaft and an output shaft; a clutch device for selectively interrupting transmission of power between said shafts; a change-speed gear means having only one engageable friction band device for providing a change in power train through said change-speed gear means; a fluid pressure operated mechanism for effecting clutch engagement; a source of fluid pressure communicating with said mechanism having a volume capacity increasing with engine speed; yieldable clutch release means normally urging said clutch out of engagement; means defining a bypass orifice also communicating with said mechanism for by-passing fluid back to said fluid source and adapted to graduate the increase of pressure supplied to said mechanism in accordance with the square of the engine speed; means responsive to manifold vacuum of said engine for varying fluid pressure supplied by said mechanism in accordance therewith; means communicating the fluid supply to said clutch operating mechanism with said fluid operated friction engaging device of said transmission; electrically operated valve means for controlling fluid flow to said friction engaging device; electrically operated dump valve means for relieving fluid pressure supplied to said clutch operating mechanism, a source of electrical energy adapted to be communicated with each of said electrically operated means for actuation thereof; manually operated switch means adapted to control the energization of each of said electrically operated valve means; and governor means responsive to the speed of said output shaft for enabling energization of said electrical valve means controlling fluid flow to said friction engaging device in accordance with the attainment of at least one predetermined speed of said output shaft.

13. A transmission for vehicles having an internal combustion engine with a manifold vacuum source, comprising: driving and driven shafts; an overdrive planetary gear set drivingly connected to said driving shaft and having an output element; a counter shaft gear set interconnecting the output element of said planetary gear set with said driven shaft, said planetary gear set having a one-way device for providing a direct forward drive therethrough and having a free-wheeling element adapted to be braked for providing a forward overdrive therethrough, said counter shaft gear set having manually operable means for selectively providing either a direct drive or a reduced forward drive therethrough; fluid operated brake means for braking said free-wheeling device of planetary gear set; electrically operated valve means for controlling fluid flow to said fluid operated brake means; and governor means responsive to the speed of said driven shaft to sequentially control the energization of said electrically operated valve means according to at least two predetermined speeds and responsive to said manifold vacuum source for varying said predetermined speeds, said governor means comprising an axially shiftable control element, a pair of switches having differential resilient means which must be overcome for respective closing of each switch, said control element being normally urged in one axial direction for opening both of said switches, means responsive to the speed of said driven shaft for moving said control element in an opposite axial direction whereby one of the switches may be closed when said speed responsive means reaches one predetermined speed and the other switch may be closed when said speed responsive means reaches a higher predetermined speed, said switches each being effective to operate by pivoting about a pivot point, said differential resilient means comprising a first spring connected between said control element and one of said switches, a second spring connected between said control element and the other switch, and means for normally urging said control element in one direction comprising a 3rd spring and a 4th spring, each being of different length whereby said control element will be initially urged solely against one of said 3rd and 4th springs and thereafter against both said 3rd and 4th springs and whereby axial movement of said control element will first overcenter said first spring with respect to the pivot point of said one switch and thereafter upon further axial movement of said control element said second spring will overcenter said pivot point for the other of said switches.

14. A transmission comprising: drive and driven shafts; means interconnecting said drive and driven shafts and effective to provide power transmission therebetween;

a fluid operated clutch means effective to interrupt the power transmission between said drive and driven shafts for permitting a change of speed ratio of said interconnecting means; said interconnecting means comprising a planetary overdrive unit having a fluid operated one-way friction device effective to change the speed ratio of said planetary unit; control means selectively providing a source of fluid pressure to both said clutch and friction device, said control means being effective to modulate said fluid pressure both in accordance with speed and generally the torque of said drive means; and governor means responsive to the speed of said driven shaft and the torque of said drive shaft effective to regulate said control means for supplying fluid to said predetermined conditions.

References Cited by the Examiner

UNITED STATES PATENTS

| | | | |
|---|---|---|---|
| 2,584,965 | 2/1952 | McFarland. | |
| 2,593,629 | 4/1952 | Swift | 74—781 |
| 2,635,480 | 4/1953 | Maurer et al. | 74—740 |
| 2,658,412 | 11/1953 | Kelbel | 74—781 |
| 2,756,851 | 7/1956 | Collins | 192—52 |
| 2,861,482 | 11/1958 | Schjolin | 74—791 |
| 2,893,526 | 7/1959 | Smirl | 192—13 |

FOREIGN PATENTS 791,358    2/1958    Great Britain.

DAVID J. WILLIAMOWSKY, *Primary Examiner.*